(12) United States Patent
Beijer et al.

(10) Patent No.: US 9,803,834 B2
(45) Date of Patent: Oct. 31, 2017

(54) ARRANGEMENT COMPRISING AN OPTICAL DEVICE AND A REFLECTOR

(71) Applicant: PHILIPS LIGHTING HOLDING B.V., Eindhoven (NL)

(72) Inventors: Johannes Gerrit Jan Beijer, Bavel (NL); Oliver Dross, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/768,458

(22) PCT Filed: Feb. 17, 2014

(86) PCT No.: PCT/IB2014/059037
§ 371 (c)(1),
(2) Date: Aug. 18, 2015

(87) PCT Pub. No.: WO2014/128606
PCT Pub. Date: Aug. 28, 2014

(65) Prior Publication Data
US 2016/0003451 A1 Jan. 7, 2016

Related U.S. Application Data

(60) Provisional application No. 61/766,254, filed on Feb. 19, 2013.

(51) Int. Cl.
*F21V 7/00* (2006.01)
*F21V 5/00* (2015.01)
(Continued)

(52) U.S. Cl.
CPC ............. *F21V 13/04* (2013.01); *F21V 5/002* (2013.01); *G02B 19/0028* (2013.01);
(Continued)

(58) Field of Classification Search
CPC .......... F21V 13/04; F21V 5/045; F21V 5/002; G02B 19/0028; G02B 19/0061
(Continued)

(56) References Cited

U.S. PATENT DOCUMENTS 1,955,599 A * 4/1934 Lamblin-Parent .. F21S 48/1233
359/743
4,700,278 A * 10/1987 Chew .................... F21V 19/006
246/473.3
(Continued)

FOREIGN PATENT DOCUMENTS

DE 19915209 A1 10/2000
EP 1427029 A2 6/2004
(Continued)

*Primary Examiner* — Peggy Neils
*Assistant Examiner* — William N Harris
(74) *Attorney, Agent, or Firm* — Akarsh P. Belagodu

(57) ABSTRACT

According to an embodiment of the present inventive concept there is provided an arrangement 4 comprising: an optical device 8 including a radially inner beam forming portion 10 and a radially outer portion 12, at least partly enclosing the radially inner portion 10. The arrangement 4 further comprises a reflector 6 arranged to reflect, in a first direction towards the radially outer portion 12, light emitted by a light source 2 such that a first optical path is formed from the light source 2 to the radially outer portion 12, via the reflector 6. The radially outer portion 12 is transparent such that incident light reaching the radially outer portion 12 along the first optical path exits the radially outer portion 12 in a direction parallel to the first direction, and at least one of scattering and attenuating for light reaching the radially outer portion 12 along a second optical path extending directly between the light source 2 and the radially outer portion 12. The radially outer portion 12 may thus act as a clear exit window for reflected light R, contributing to the intensity of a central beam F formed by the radially inner
(Continued)

beam forming portion 10, while preventing transmission of direct light D which otherwise could produce glare.

17 Claims, 3 Drawing Sheets

(51) Int. Cl.
*F21V 13/04* (2006.01)
*G02B 27/09* (2006.01)
*G02B 19/00* (2006.01)
*G02B 3/08* (2006.01)

(52) U.S. Cl.
CPC ......... *G02B 19/0061* (2013.01); *G02B 27/09* (2013.01); *G02B 27/095* (2013.01); *G02B 3/08* (2013.01)

(58) Field of Classification Search
USPC .................................................. 362/308, 327
See application file for complete search history.

(56) References Cited

U.S. PATENT DOCUMENTS

| | | | |
|---|---|---|---|
| 4,767,172 A | 8/1988 | Nichols et al. | |
| 5,160,192 A * | 11/1992 | Sugawara | F21V 7/08 362/16 |
| 7,118,253 B1 | 10/2006 | Simon | |
| 2003/0053314 A1 | 3/2003 | Summerford et al. | |
| 2005/0024746 A1* | 2/2005 | Shimura | F21V 5/045 359/742 |
| 2005/0135106 A1 | 6/2005 | Kittelmann et al. | |
| 2005/0141087 A1 | 6/2005 | Yoshida | |
| 2005/0201101 A1* | 9/2005 | Shimura | G02B 3/08 362/330 |
| 2005/0201109 A1* | 9/2005 | Shimura | F21V 5/045 362/382 |
| 2005/0286145 A1* | 12/2005 | Silhengst | F21V 5/045 359/742 |
| 2006/0285351 A1 | 12/2006 | Erber et al. | |
| 2008/0247173 A1 | 10/2008 | Danek et al. | |
| 2010/0026703 A1 | 2/2010 | Parker et al. | |
| 2010/0061105 A1* | 3/2010 | Shyu | F21V 5/045 362/311.02 |
| 2011/0261569 A1 | 10/2011 | Kayanuma | |
| 2012/0051058 A1* | 3/2012 | Sharma | F04B 43/046 362/294 |
| 2012/0300466 A1* | 11/2012 | Asai | G02B 19/0009 362/297 |
| 2013/0051029 A1* | 2/2013 | Suzuki | F21V 5/045 362/297 |
| 2014/0049939 A1* | 2/2014 | Kuenzler | F21K 9/64 362/84 |

FOREIGN PATENT DOCUMENTS

| | | |
|---|---|---|
| EP | 2093480 A2 | 8/2009 |
| EP | 2261551 A1 | 12/2010 |
| JP | 2009205872 A | 9/2009 |

* cited by examiner

ARRANGEMENT COMPRISING AN OPTICAL DEVICE AND A REFLECTOR

CROSS-REFERENCE TO PRIOR APPLICATIONS

This application is the U.S. National Phase application under 35 U.S.C. §371 of International Application No. PCT/IB14/059037, filed on Feb. 17, 2014, which claims the benefit of U.S. Provisional Patent Application No. 61/766,254, filed on Feb. 19, 2013. These applications are hereby incorporated by reference herein.

FIELD OF THE INVENTION

The present inventive concept relates to an arrangement comprising an optical device and a reflector.

BACKGROUND OF THE INVENTION

Many types of light sources (e.g. LEDs, incandescent light sources, fluorescent light sources) emit diverging light beams. In order to improve a peak intensity of a beam output by the light source and/or provide the beam with a desired profile a focusing lens may be arranged at an exit aperture of a lamp. The lens may collect and focus at least a portion of the light from the light source along the optical axis of the lens. One type of focusing lens which enables a compact lamp design with a single lens optics is the Fresnel lens. However the further away from the optical axis of a lens the worse the light collecting efficiency of the lens may be. This may apply to Fresnel lenses in particular and also to focusing lenses in general. Above a certain point, an enlargement of the exit aperture and the lens may hence not result in more light being collected into the beam and thus a desired beam profile and intensity increase may not be obtained.

SUMMARY OF THE INVENTION

A general objective of the present inventive concept is hence to at least partially overcome the aforementioned limitations. According to an aspect of the inventive concept, this object is addressed by an arrangement comprising an optical device including a radially inner beam forming portion, and a radially outer portion at least partly enclosing the radially inner portion. The arrangement further comprises a reflector arranged to reflect, in a first direction towards the radially outer portion, light emitted by a light source, such that a first optical path is formed from the light source to the radially outer portion via the reflector. The radially outer portion is transparent such that incident light reaching the radially outer portion along the first optical path exits the radially outer portion in a direction parallel to the first direction, and at least one of scattering and attenuating for light reaching the radially outer portion along a second optical path extending directly between the light source and the radially outer portion.

Light reaching the radially outer portion along the first optical path may be referred to as "reflected light". Light reaching the radially outer portion along the second optical path may be referred to as "direct light".

The optical device may form a first portion of the light emitted by the light source into a primary beam of a desired profile. The reflector may direct a reflected light beam towards at least the radially outer portion of the optical device. By the design of the radially outer portion, reflected light which is incident on the radially outer portion may be transmitted substantially without being redirected. In a sense, the radially outer portion may thus act as a clear exit window for the reflected light. The reflected light may thereby be transmitted through the optical device and contribute to the intensity of the primary beam. Compared to a prior art focusing lens, a non-focusing exit window thus replaces a radially outer focusing portion of the lens.

In contrast, the radially outer portion may scatter and/or attenuate the direct light and thereby prevent the direct light from forming a halo, i.e. a secondary ring of light, around the primary beam. To an observer the secondary ring of light could otherwise be perceived as glare not contributing to the intensity of the primary beam. The radially outer portion may thus provide a double function by acting as a substantially clear exit window for reflected light while preventing glare producing direct light to be transmitted. The arrangement is thus especially advantageous to use in applications where a comparably high intensity output is desired whereas glare is not.

The radially outer portion may be scattering by redirecting or splitting the direct light into a plurality of different directions.

According to one embodiment the radially outer portion comprises a structure arranged to scatter light reaching the radially outer portion along the second optical path by splitting at least a portion of said light into a plurality of directions. Direct light may thereby be divided into a plurality of directions or "channels".

According to one embodiment the radially outer portion presents, for a portion of the light reaching the radially outer portion along the second optical path, at least two interfaces between two media of different refractive indices, wherein a first one of said interfaces is angled with respect to a second one of said interfaces. The ray of the portion of the direct light may be transmitted at both the first one and the second one of the interfaces and thus be redirected from the original direction of the beam. The ray may also be partially reflected at the first and/or second one of the interfaces into further directions also different from the original direction of the beam.

According to one embodiment the radially outer portion presents, for said portion of light reaching the radially outer portion along the second optical path, also at least a third interface between two media of different refractive indices. Said portion of direct light may hence be transmitted and refracted, or partially reflected at an even further interface, resulting in further scattering of the direct light. The third interface may be angled with respect to each one of the first interface and the second interface. The direct light may thereby be deflected from the original beam direction even more strongly.

According to one embodiment the radially outer portion presents, for light reaching the radially outer portion along the first optical path, two interfaces between two media of different refractive indices, wherein each one of said two interfaces are parallel to each other. At least a portion (advantageously a majority) of the reflected light may thereby be transmitted by the radially outer portion and exit the radially outer portion in a direction parallel to the first direction, i.e. the direction in which the reflector directs the reflected light. One of said two interfaces may be the above-mentioned first interface.

According to one embodiment the radially outer portion presents a plurality of protrusions extending from a first main surface of the radially outer portion and being spaced apart in a radial direction along the first main surface. The protrusions enable a simple yet efficient design of the radially outer portion which may scatter and/or attenuate the direct light and transmit reflected light without affecting the transmitted light appreciably. The first main surface may either face towards the reflector or face in a direction away from the reflector. The protrusions may be formed as concentric rings on the first main surface. The ring shaped protrusions may be centered about the radially inner beam forming portion.

Each protrusion may present a radially inner side surface facing in a radially inward direction and a radially outer side surface facing in a radially outward direction, the protrusions being arranged such that light reaching the radially outer portion along the second optical path interacts with at least one of an inner side surface and an outer side surface. The direct light may thus be transmitted or reflected by side surfaces of the protrusions. An angle between a side surface of a protrusion and a direction of the second optical path may be greater than an angle between said side surface and said first direction. This enables the fraction of the direct light interacting with the side surfaces to be greater than the fraction of the reflected light interacting with the side surfaces.

According to one embodiment the protrusions are formed such that: a first portion of the light reaching the radially outer portion along the second optical path is refracted at a radially inner side surface of a protrusion into said protrusion and transmitted at the radially outer side surface of said protrusion. The protrusions may further be formed such that: a second portion of the light reaching the radially outer portion along the second optical path is refracted at a radially inner side surface of a protrusion into said protrusion and transmitted from the radially outer portion in a direction away from the reflector or internally reflected within said protrusion in a direction towards the reflector. The protrusions may further be arranged such that: a third portion of the light reaching the radially outer portion along the second optical path is internally reflected by the radially outer side surface and thereafter transmitted by the radially outer portion in a direction away from the reflector. Each protrusion may further present an end surface which is parallel to said first main surface and a second main surface of the radially outer portion, the second main surface being opposite to the first main surface. The end surface may extend between a radially inner and a radially outer side surface of the protrusion. These designs of the protrusions make it possible to divide the direct light into several different channels which do not combine (i.e. spatially overlap) outside of the arrangement while allowing reflected light to be transmitted without being redirected appreciably.

According to one embodiment said protrusions include at least a first, a second and a third protrusion, the first protrusion arranged radially inside of the second and third protrusion and the second protrusion arranged radially inside of the third protrusion. According to one option a radial separation between the first and the second protrusion is smaller than a radial separation between the second and the third protrusion, and a height of the first, second and third protrusions are equal. According to one option a radial separation between the first and the second protrusion and the second and the third protrusion are equal and a height of the first protrusion is greater than a height of the second protrusion, and a height of the second protrusion is greater than a height of the third protrusion. These options both enable the design of the protrusions to be varied while taking an increasing angle of incidence for light further radially out on the radially outer portion into account. This may in turn enable the material consumption for the radially outer portion and thus the optical device to be optimized.

The arrangement may further comprise a light source. The light source may be arranged to emit light towards the radially inner beam forming portion and the reflector. According to one embodiment the radially inner beam forming portion is arranged to collimate a portion of the light emitted by the light source. The beam forming portion may thus be arranged to form a collimated primary beam. Also the reflector may be arranged to collimate the reflected light. The reflector may be arranged to direct the collimated reflected light in a direction parallel to the beam collimated by the beam forming portion. According to one embodiment the beam forming portion is a focusing lens. The lens may collect and focus a portion of a diverging light distribution emitted by the light source to form the primary light beam. The first optical path may extend from a focal point of the focusing lens to the radially outer portion via the reflector. Additionally, the second optical path may extend directly between the focal point of the focusing lens and the radially outer portion.

In accordance with a further aspect there is provided an optical device including a radially inner beam forming portion and a radially outer portion at least partly enclosing the radially inner portion, wherein the radially inner beam forming portion is arranged to focus light along an optical axis of the radially inner beam forming portion. The radially outer portion is transparent such that incident light reaching the radially outer portion in a first direction exits the radially outer portion in a direction parallel to the first direction, and at least one of scattering and attenuating for light reaching the radially outer portion in a second direction which is different from the first direction. The radially inner beam forming portion may be arranged to collimate light along the optical axis. The first direction may be parallel to the optical axis of the radially inner beam forming portion. Moreover, the second direction may coincide with an optical path extending from a focal point of the radially inner beam forming portion to the radially outer portion. The inventive optical device may be used together with a reflector to provide an arrangement presenting the advantages discussed in connection with the above disclosed aspect. The details, further advantages and the embodiments discussed above apply correspondingly to this further aspect. For brevity, the above discussion will therefore not be repeated here.

It is noted that the invention relates to all possible combinations of features recited in the claims.

BRIEF DESCRIPTION OF THE DRAWINGS

These and other aspects of the present invention will now be described in more detail, with reference to the appended drawings showing embodiment(s) of the invention wherein like reference numerals refer to like elements throughout unless stated otherwise.

DETAILED DESCRIPTION

Aspects of the present inventive concept will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
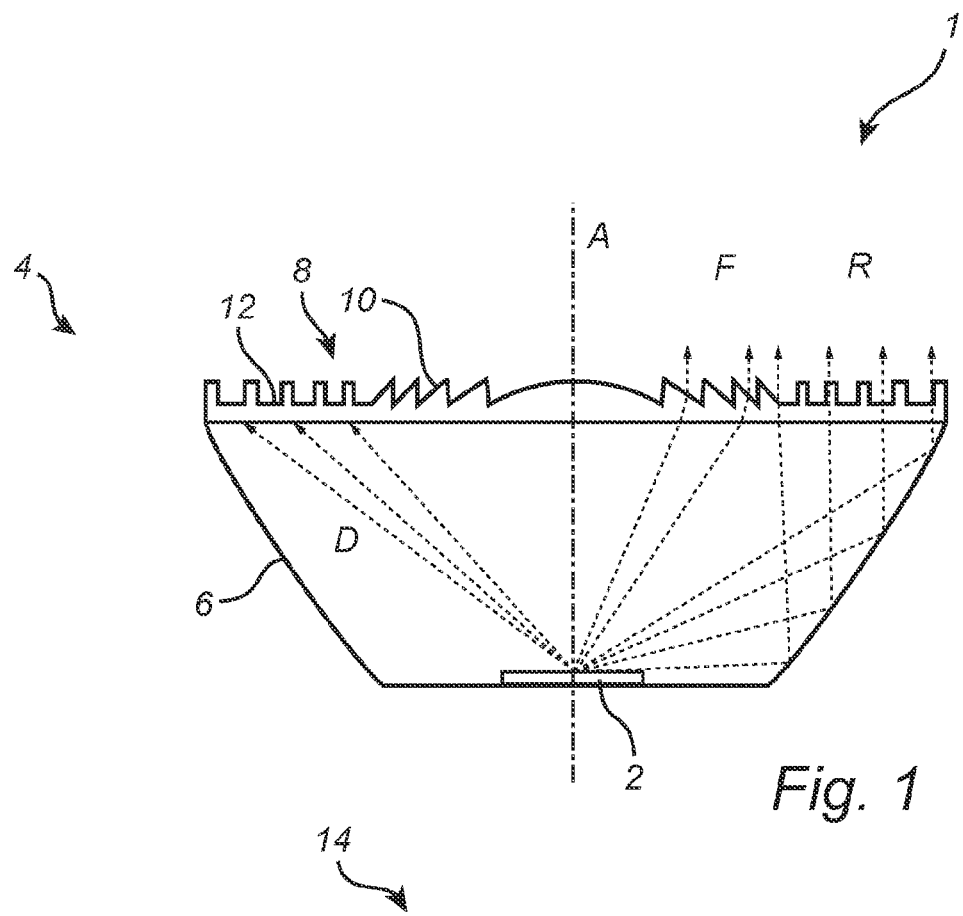
FIG. 1 is a schematic illustration of a lamp according to a first embodiment.

FIG. 1 is a schematic sectional view of a lamp 1 in accordance with a first embodiment. The lamp 1 includes an arrangement 4 including a light source 2, a focusing reflector 6 and an optical device 8. As in the illustrated embodiment the reflector 6 may be a parabolic reflector. An advantage with a parabolic reflector is that it may minimize spherical aberrations. However in alternative embodiments the reflector 6 may be any type of focusing reflector, such as a spherical reflector. An advantage with a spherical reflector is that it may be comparably simple to produce. The optical device 8 further comprises a radially inner beam forming portion 10 in the form of a focusing lens. As in the illustrated embodiment the lens 10 may be a Fresnel lens. A Fresnel lens allows for a compact single lens design of the lamp 1. However in alternative embodiments the lens 10 may instead be a focusing spherical lens, such as a biconvex or a plano-convex spherical lens. The light source 2, the reflector 6 and the lens 10 are arranged along a common axis 'A' representing the optical axis of the reflector 6 and the lens 10. Thus the optical axis of the reflector 6 is coaxial with the optical axis of the lens 10. In other words the optical axis of the reflector 6 coincides with the optical axis of the lens 10. The reflector 6 and the lens 10 are further arranged such that their respective focal points coincide.

The optical device 8 further includes an optically transparent radially outer portion 12, described in greater detail below. The radially outer portion 12 forms an annular portion of the radially outer portion 12 and encloses the lens 10 in the radial direction. In this embodiment the radial direction is perpendicular to the axis A.

The light source 2 is arranged to emit light in a plurality of directions. The light source 2 may for example emit a diverging beam along the axis A. The light source 2 is arranged at the focal point of the reflector 6 and the lens 10, respectively. The light source 2 may for example include a LED, an incandescent light source, a fluorescent light source, a fluorescent light source, a HID light source or the like. In some embodiments the light source 2 may include a plurality of such light sources. To facilitate understanding it will be assumed that the light source 2 is a point source. However, in practice the light source 2 may emit light over an extended surface.

A first portion of the light emitted by the light source 2 travels directly towards a light receiving side of the lens 10. The lens 10 is arranged to focus the first portion of light emitted by the light source 2 such that a collimated light beam is emitted along the optical axis A from a light exit side of the lens 10. The light beam formed by the lens 10 forms a primary light beam (illustrated by the bundle of paraxial light rays denoted 'F' in FIG. 1). It should be noted that the actual ratio of focused light which is collimated by the lens 10 may depend on the type of lens used and how accurately it has been designed. However, advantageously at least a part of the focused light F may be collimated.

A second portion of the light emitted by the light source 2 travels from the light source 2 directly towards the reflector 6. The reflector 6 is arranged to reflect and focus light emitted by the light source 2 into a collimated light beam travelling towards the optical device 8 and through the radially outer portion 12. The second portion of light thus travels along an indirect optical path extending from the light source 2 to the radially outer portion 12 via the reflector 6. The light emitted by the light source 2 and which is reflected by the reflector 6 towards the radially outer portion 12 will in the following be referred to as "reflected light" (illustrated by the bundle of paraxial light rays denoted 'R' in FIG. 1). The reflected light R travels in what will be referred to as a first direction which is parallel with a straight-line optical path extending between the reflector 6 and the radially outer portion 12. It should be noted that the actual ratio of reflected light R which is collimated by the reflector 6 may depend on the type of reflector used and how accurately it has been designed. However, advantageously at least a part of the reflected light R may be collimated.

The radially outer portion 12 is arranged to be transparent for the reflected light R such that the reflected light R is transmitted by the radially outer portion 12 without being redirected or attenuated appreciably. The transmitted portion of the reflected light R may thereby contribute to the intensity of the primary light beam formed by the focused light F. Together, the reflected light R and the focused light F may form a continuous primary light beam.

A third portion of the light emitted by the light source 2 travels from the light source 2 directly towards the radially outer portion 12 of the optical device 8. The third portion of light thus travels along a straight line optical path extending directly between light source 2 and the radially outer portion 12. The third portion of light will be referred to as "direct light" (illustrated by the bundle of light rays denoted 'D' in FIG. 1). The direction in which a (candidate) ray of the bundle of light rays forming the direct light D travels towards the radially outer portion 12 may be referred to as a second direction. The radially outer portion 12 is arranged to be at least one of scattering or attenuating for the direct light D. An intensity of light transmitted along the direct path through the radially outer portion 12 may thereby be appreciably lower than an intensity of the direct light D incident on the radially outer portion 12. The intensity of the direct light D may thereby be advantageously reduced outside of the lamp 1 wherein formation of a secondary ring of light (i.e. glare) outside the primary beam may be avoided.

The radially outer portion 12, as any transparent element, may slightly attenuate also the reflected light R. In the present embodiment the attenuation of the direct light D by the radially outer portion 12 however exceeds, advantageously appreciably, the attenuation of the reflected light R by the radially outer portion 12. In other words, the radially outer portion 12 may attenuate the reflected light R by a first amount and the direct light D by a second amount, wherein the second amount of attenuation exceeds the first amount of attenuation.

As schematically illustrated by the bundle of rays D in FIG. 1 the direct light D may be incident on different radial positions on the radially outer portion 12 and may thus arrive from slightly different directions. However all rays in the bundle D reach the radially outer portion 12 along an optical path extending directly between the light source 2 and a respective point on the radially outer portion 12.

For clarity reasons the focused light rays F and the reflected light rays R are only shown on the right hand side of the axis A whereas the direct light rays D is shown on the left hand side of the axis A in FIG. 1. However in practice focused light F, reflected light R and direct light D may exist in a rotationally symmetric distribution about the axis A.

Figure 2:
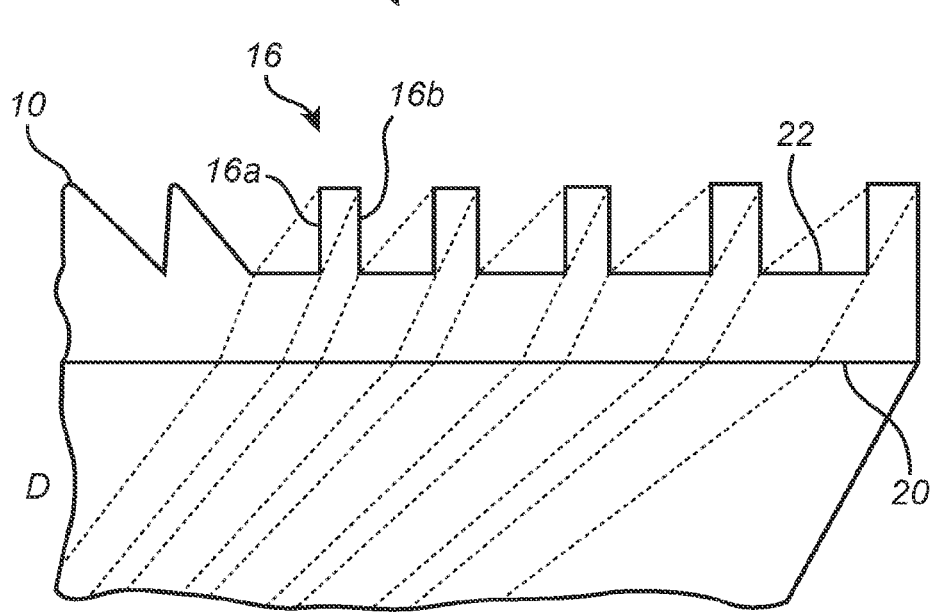
FIG. 2 is a detail view of a portion of the lamp of in FIG. 1.

FIG. 2 is a detail view illustrating the radially outer portion 12 in greater detail. The radially outer portion 12 presents a structure including a plurality of annular protrusions commonly referenced 14 which are spaced apart radially. Each protrusion 14 extends along the axis A in a direction away from the reflector 6 and in a circumferential direction about the lens 10 to enclose the lens 10 in a radial direction. The protrusions 14 are arranged on a main surface 22 of the radially outer portion 12 and form concentric rings on the surface 22 which are centered on the axis A. The surface 22 forms a light exit side of the optical device 8. The radially inner protrusion 16 (and also each one of the further protrusions 14) presents a radially inner side or lateral surface 16a facing in a radially inward direction towards the lens 10, and a radially outer side or lateral surface 16b facing in a radially outward direction away from the lens 10. The protrusions 14 present a height, width and separation such that incident direct light D is reflected and/or transmitted at at least one of an inner side surface and an outer side surface of a protrusion 14.

Figure 3:
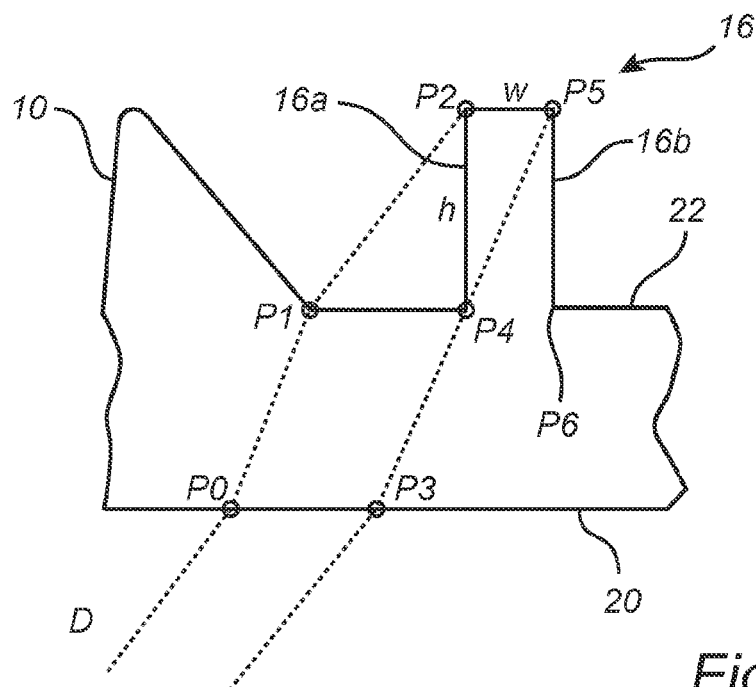
FIG. 3 is a detail view of a portion of the lamp in FIG. 2.

With reference to FIG. 3 a ray tracing procedure which may be used to design the structure will now be described. Although in the following it will be assumed that the protrusions 14 are arranged at the light exit side of the optical device 8, it is possible to instead arrange protrusions on the surface 20 on the opposite light entry side of the optical device. The structure may then be designed in an analogous manner to what now will be described: A first ray is traced from the light source 2 to the point P0. The first ray enters the radially outer portion 12 at the surface 20 of the radially outer portion 12. The first ray is refracted into the radially outer portion 12 and exits the radially outer portion 12 at point P1. The traced first ray thus represents the radially innermost ray of the direct light D which reaches the radially outer portion 12. A ray incident on the optical device 8 on a radial position inside of P0 will be refracted by the lens 10 instead. Upon exit at point P1 the first ray is once more refracted and traced until it reaches point P2 at a predefined distance h from the surface 22. The distance h defines the height of the protrusion 16 above the surface 22. The radial distance between the point P2 and the radially outer edge of the lens 10 (i.e. point P1) determines the (radial) position of the base of the radially inner surface 16a, i.e. at point P4. According to the illustrated embodiment the radially inner surface 16a extends in parallel to the first direction (i.e. the direction of the reflected light R). In order to determine the radial dimension (i.e. width w) of the protrusion 16, a second ray is traced from the light source 2 to a point P3 such that after refraction at P3 the ray goes through P4. The ray is extended without refraction at P4 until reaching height h, thereby defining point P5. The radial distance between the point P2 and the point P5 determines the (radial) position of the base of the radially outer surface 16b, i.e. point P6. According to the illustrated embodiment the radially outer surface 16b extends in parallel to the first direction (i.e. the direction of the reflected light R).

Although in the illustrated embodiment the radially inner surface 16a and radially outer surface 16b are perpendicular to the surface 22, in alternative embodiments (further described below) a non-perpendicular arrangement is also possible.

By designing the protrusion 16 as illustrated in FIG. 3 direct light that is incident on the radially inner surface 16a may be refracted into the protrusion 16. A first portion of the refracted light may be transmitted by the protrusion 16 and leave the same at the radially outer surface 16b. A second portion of the refracted light may reach the top surface of the protrusion 16 wherein the light may be refracted to larger angles. Alternatively the second portion of light may be totally internally reflected within the protrusion 16 in a direction back towards the reflector 6. On the other hand, light that enters the protrusion 16 via the base thereof (i.e. between points P4 and P6) may be totally internally reflected at the radially outer surface 16b and, after a second refraction at the top surface of the protrusion 16, leave to large angles with respect to the axis A. The above ray tracing process may be repeated in an analogous manner to obtain the position, width and height of the further protrusions 14.

For a portion of the direct light D (e.g. a ray entering the radially outer portion somewhere between P0 and P3 in FIG. 3) the surface 20 forms a first interface, the surface 22 forms a second interface, the radially inner surface 16a forms a third interface, and the radially outer surface 16b forms a fourth interface, wherein the third and fourth interfaces are angled with respect to the first and the second interfaces. Meanwhile for a portion of the reflected light R (e.g. a ray travelling in a direction perpendicular to the surfaces 20, 22 in FIG. 3) the surface 20 presents a first interface and the surface 22 (or, depending on the off axis distance of the ray, the top surface of the protrusion 16) forms a second interface, wherein each one of said two interfaces are parallel to each other. In this context, "interface" may be understood as an interface between two medias of different refractive index, i.e. the refractive index of an ambient atmosphere and the refractive index of the transparent material of which the optical device 8 is formed. By designing the radially outer portion 12 in this manner the direct light D from the light source 2 may, instead of being transmitted by the radially outer portion 12 into a substantially unchanged direction, be split into a plurality of different directions or channels. Meanwhile the reflected light R may be transmitted by the radially outer portion 12 without being affected appreciably.

The height h of the protrusion 16 is preferably such that the radially innermost first ray hits the uppermost portion of the radially inner surface 16a. I.e. the height h may be chosen to such that the radially innermost first ray is "captured" by the radially inner surface 16a of the protrusion 16. Applying this principle to the further protrusions 14 it follows that a ratio between the height h of a first protrusion and a radial separation between the first protrusion and a second adjacent protrusion may be such that any direct light D transmitted at a connecting portion of the surface 20 extending between the first and second protrusions hits the radially inner side surface of the second protrusion. The ratio need not be any greater than this but may be made greater if desired for design reasons. In case scattering or attenuation of only a portion of the direct light D is acceptable the ratio may even be smaller such that some of the direct light D transmitted at the connection portion of the surface 20 extending between the first and the second protrusions avoids the radially inner surface and travels past and above the second protrusion.

From the discussion concerning the ratio it may be understood that all or some of the protrusions 14 may be of a same height and the radial separation between adjacent protrusions 14 may increase along a radially outward direction (as in FIG. 2). Alternatively or additionally, a radial separation between all or some of the protrusions 14 may be equal whereas the height of a radially inner protrusion is greater than a height of a radially outer protrusion.

Figure 4:
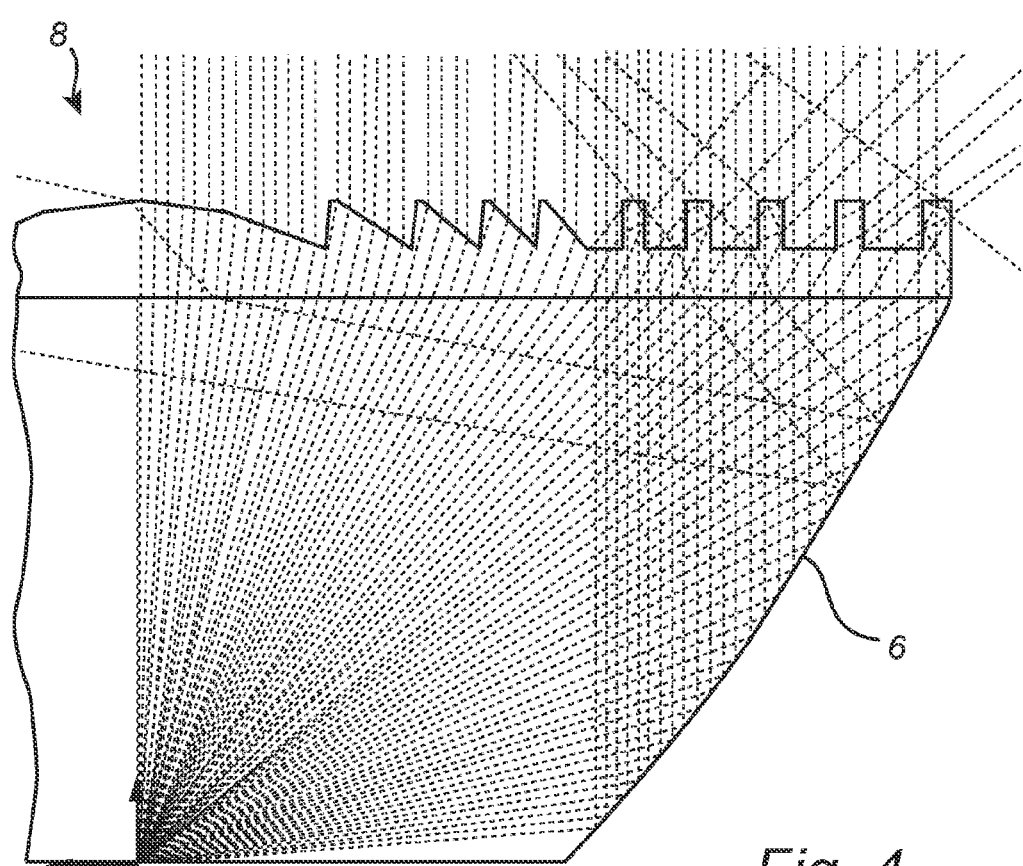
FIG. 4 schematically illustrates a ray trace for a portion of the lamp in FIG. 1.

FIG. 4 illustrates the result of a ray trace for the lamp 1 wherein the protrusions 14 of the radially outer portion 12 have been designed in accordance with the procedure described in connection with FIG. 3. For simplicity the resulting rays are shown only for a portion of the lamp 1.

Instead of having parallel radially inner and outer side surfaces, each protrusion 14 may be tapered along the first direction (i.e. the direction of the reflected light R), i.e. present a decreasing width w along the first direction. Exemplifying for the protrusion 16, according to this option the radially inner 16a and outer surface 16b may extend at different non-zero angles with respect to the first direction. The protrusion 16 may even be extended to a height h such that the radially inner 16a and outer surface 16b joins to form a tip. By the radially inner and outer surfaces 16a, 16b being non-parallel, a light ray which enters a protrusion at the radially inner surface 16a and exits at a radially outer surface 16b may be even more strongly refracted and not only parallel displaced. For example each one of the radially inner surface and the radially outer surface may extend at an angle in the range of 0-10° with respect to the first direction. By limiting the angles to this range the greater part of the reflected light R will not be appreciably affected (e.g. refracted) by the radially inner or outer surfaces 16a, 16b.

The person skilled in the art realizes that the present invention by no means is limited to the embodiments described above. On the contrary, many modifications and variations are possible within the scope of the appended claims. In one variation the radially inner surface (and possibly also the radially outer surface) of each protrusion 14 may be provided with a light scattering surface (e.g. the surfaces 16a, 16b may be roughened). Incident direct light D may thereby be further scattered. In a further variation the radially inner surface (and possibly also the radially outer surface) of each protrusion 14 may be provided as a completely or partially opaque surface. For example the respective surfaces may be provided with an opaque coating. The direct light D may thereby be blocked (in case of completely opaque surfaces) or attenuated (in case of partially opaque surfaces) whereas the reflected light R may be transmitted by the radially outer portion without being affected (e.g. redirected or attenuated) appreciably.

Figure 5:
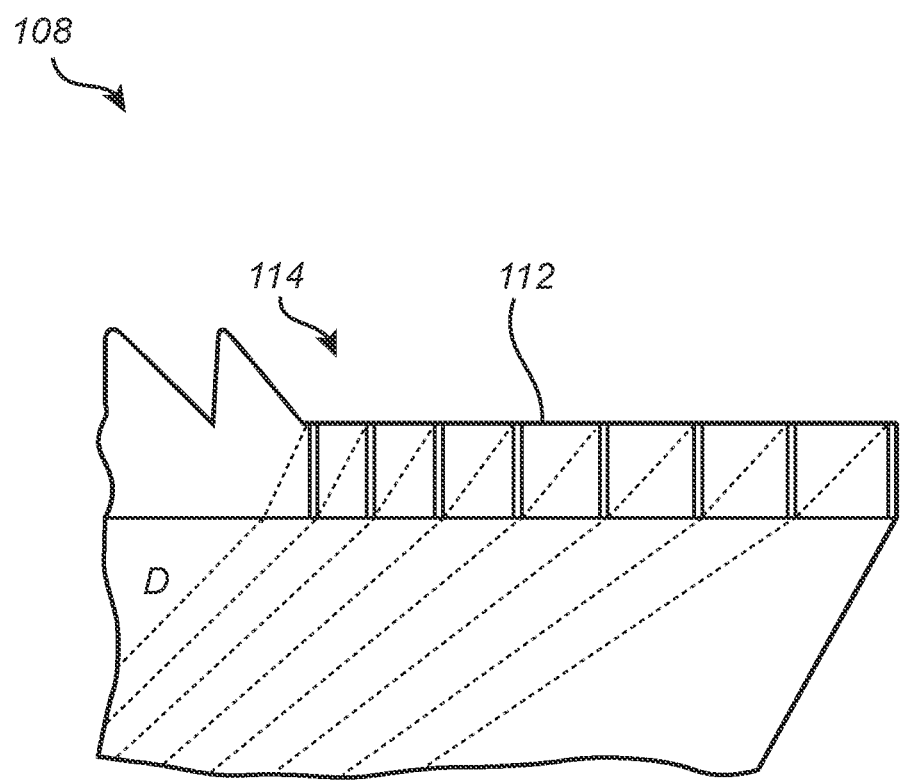
FIG. 5 is a schematic illustration of a lamp according to a second embodiment.

FIG. 5 illustrates a further embodiment of a lamp which is similar to the lamp 1. However, instead of the protrusions 14 it comprises an optical device 108 including a transparent radially outer portion 112 provided with a plurality of completely or partially opaque annular sections or partitions 114 which are integrated in the radially outer portion 112. The sections 114 form concentric rings centered about the optical axis A of the lens. The height of the sections 114 preferably equals the thickness of the radially outer portion 112. The above discussion of the ratio between the height and the radial separation of the protrusions 14 applies correspondingly to the height and separation of the sections 114. Preferably the ratio is such that at least the major part of the direct light D emitted by the light source 2 is blocked (in case of completely opaque sections 114) or attenuated (in case of partially opaque sections 114) by the sections 114. The sections 114 extend in a direction parallel to the direction of the reflected light R. Thus the greater portion of the light reaching the radially outer portion 112 along an optical path extending from the light source 2 to the radially outer portion 112 via the reflector 6 may be transmitted by the radially outer portion without being affected (e.g. redirected or attenuated) appreciably by the sections 114.

Although in the above, a configuration of the light source 2, the reflector 6 and the lens 10 resulting in collimated light beams have been described, the invention is applicable also to other, non-collimating configurations. For example the light source 2 may be arranged at a distance from the lens 10 which is smaller than the focal length of the lens 10 to obtain a light beam from the lens 10 which diverges by a predetermined amount (i.e. a bundle of light rays F which diverges from the optical axis of the lens 10). The light source 2 may further be arranged at a distance from the reflector 6 which is smaller than the focal length of the reflector 6 to obtain a reflected light beam which diverges by a predetermined amount (i.e. a bundle of light rays R diverging with respect to the optical axis of the lens 10). The amount of divergence of the light beam formed by the lens 10 may be the same as the amount of divergence of the light beam formed by the reflector 6. In such configurations, protrusions similar to the protrusions 14 may be provided on the radially outer portion 12 but which instead extend along the direction of incidence of the reflected light R (which direction hence is non-parallel with the axis A of the lens 10) and present a width, height and separation such that direct light D from the light source 2 is divided into a plurality of different directions. Such protrusions may be designed using a ray tracing procedure similar to the above disclosed procedure. Alternatively, sections similar to the sections 114 in FIG. 5 may be integrated into the radially outer portion 112 in a slanted manner to be parallel or close to parallel with a direction of incidence of the reflected light R.

The optical device 8 and the optical device 108 and the above described variations thereof may be considered as embodiments of an independent aspect of the inventive concept. With reference to FIGS. 1 and 5 there is accordingly provided an optical device 8, 108 including a radially inner beam forming portion 10, such as a lens, and a radially outer portion 12, 112 at least partly enclosing the radially inner portion 10, wherein the radially inner beam forming portion 10 is arranged to focus, preferably collimate, light along an optical axis A of the radially inner beam forming portion 10, and wherein the radially outer portion 12, 112 is transparent such that incident light reaching the radially outer portion 12, 112 in a first direction, which preferably is parallel to the optical axis A, exits the radially outer portion 12, 112 in a direction parallel to the first direction, and at least one of scattering and attenuating for light reaching the radially outer portion 12, 112 in a second direction which is different from the first direction. The second direction may coincide with an optical path extending from a focal point of the radially inner beam forming portion 10 or lens to the radially outer portion 12, 112.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An arrangement comprising:
   an optical device including a radially inner beam forming portion and a radially outer portion at least partly enclosing the radially inner portion;
   a reflector arranged to reflect, in a first direction towards the radially outer portion, light emitted directly from a light source, said emitted light originating from the focal point of the reflector such that a first optical path is formed from the light source to the radially outer portion via the reflector;
   wherein the radially outer portion is transparent such that incident light reaching the radially outer portion along the first optical path exits the radially outer portion in a direction parallel to the first direction, and light reaching the radially outer portion along a second optical path extending directly between the light source and the radially outer portion exits the radially outer portion in at least one of a scattered or an attenuated state, wherein the radially inner beam forming portion is arranged to collimate a portion of the light emitted by the light source, wherein the radially outer portion comprises a first plurality of protrusions and the radially inner portion comprises a second plurality of protrusions, wherein the first plurality of protrusions comprises different structures than the second plurality of protrusions, and wherein an angle between a side surface of the first plurality of protrusions and the second optical path is greater than an angle between said side surface and said first direction.

2. The arrangement according to claim 1, wherein the radially outer portion comprises a structure arranged to scatter light reaching the radially outer portion along the second optical path by splitting at least a portion of said light into a plurality of directions.

3. The arrangement according to claim 1, wherein the radially outer portion presents, for at least a portion of the light reaching the radially outer portion along the second optical path, at least two interfaces between the optical device and an ambient atmosphere, said ambient atmosphere having a refractive index different from a refractive index of said optical device, wherein a first one of said interfaces is angled with respect to a second one of said interfaces.

4. The arrangement according to claim 3, wherein the radially outer portion presents, for said at least a portion of light reaching the radially outer portion along the second optical path, at least said first and said second interface and a third interface between the radially outer portion and the ambient atmosphere.

5. The arrangement according to claim 4, wherein the third interface is angled with respect to each one of the first interface and the second interface.

6. The arrangement according to claim 1, wherein the radially outer portion presents, for at least a portion of the light reaching the radially outer portion along the first optical path, two interfaces between the optical device and an ambient atmosphere, said ambient atmosphere having a refractive index different from a refractive index of said optical device, wherein each one of said two interfaces are parallel to each other.

7. The arrangement according to claim 1, wherein the radially outer portion presents the first plurality of protrusions extending from a first main surface of the radially outer portion and being spaced apart in a radial direction.

8. The arrangement according to claim 7, wherein each protrusion presents a radially inner side surface facing in a radially inward direction and a radially outer side surface facing in a radially outward direction, the protrusions being arranged such that light reaching the radially outer portion along the second optical path interacts with at least one of an inner side surface and an outer side surface.

9. The arrangement according to claim 7, wherein the protrusions are formed such that: a first portion of the light reaching the radially outer portion along the second optical path is refracted at a radially inner side surface of a protrusion into said protrusion and transmitted at the radially outer side surface of said protrusion.

10. The arrangement according to claim 9, wherein the protrusions are formed such that: a second portion of the light reaching the radially outer portion along the second optical path is refracted at a radially inner side surface of a protrusion into said protrusion and transmitted from the radially outer portion in a direction away from the reflector or internally reflected within said protrusion in a direction towards the reflector.

11. The arrangement according to claim 7, wherein the protrusions are arranged such that: a third portion of the light reaching the radially outer portion along the second optical path is internally reflected by the radially outer side surface and thereafter transmitted by the radially outer portion in a direction away from the reflector.

12. The arrangement according to claim 1, wherein the reflector is arranged to collimate the reflected light.

13. The arrangement according to claim 1, further comprising a light source, wherein the light source is arranged to emit light towards the radially inner beam forming portion and the reflector.

14. The arrangement according to claim 6, wherein the first plurality of protrusions are annular, are spaced apart radially and form concentric rings centered on the optical axis of the reflector.

15. The arrangement according to claim 5, wherein the third interface is parallel with respect to the second interface.

16. The arrangement according to claim 5 wherein the third interface extends parallel to the first direction.

17. The arrangement according to claim 1, wherein radial separation between adjacent protrusions of the first plurality of protrusions increases along a radially outward direction, wherein radial separation between adjacent protrusions of the second plurality of protrusions decreases along the radially outward direction.

* * * * *